May 16, 1939.　　　A. DOBROWOLSKI　　　2,158,618
TRICYCLE
Filed Dec. 22, 1937
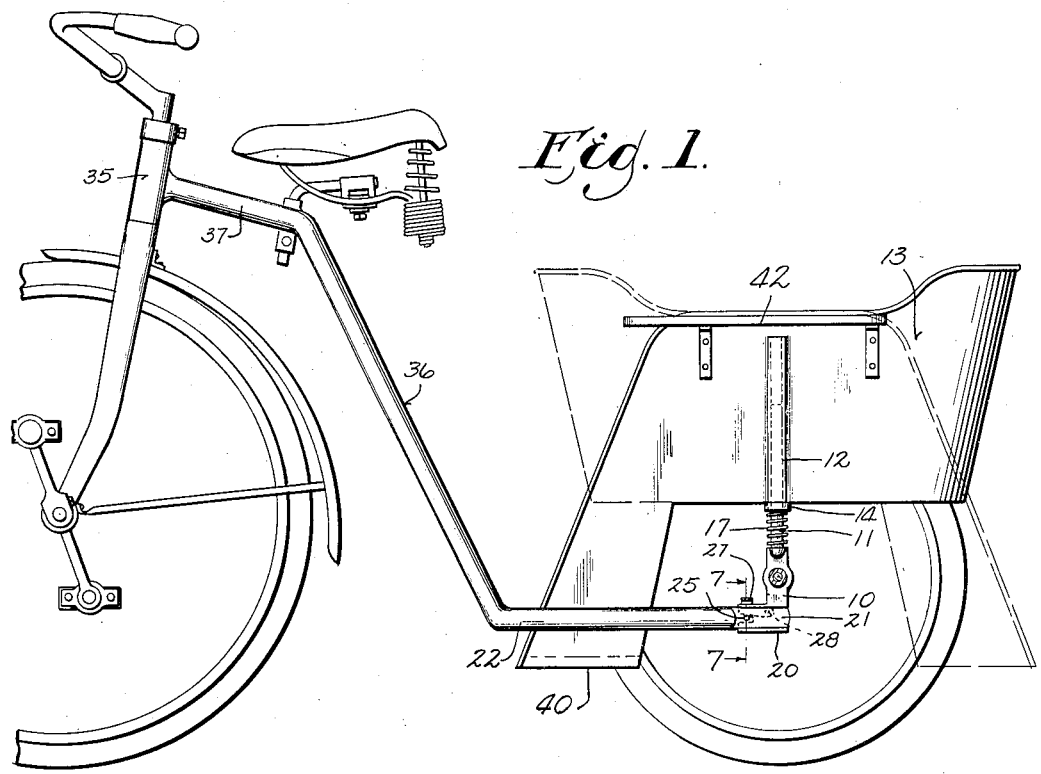
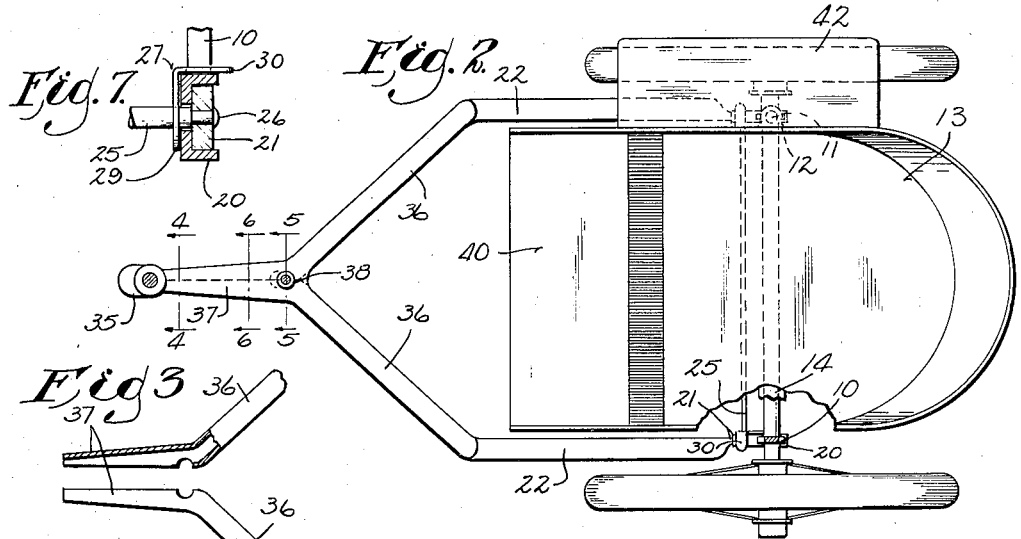
INVENTOR
ALFONS DOBROWOLSKI
BY
Wheeler, Wheeler & Wheeler
ATTORNEYS Patented May 16, 1939

2,158,618

UNITED STATES PATENT OFFICE 2,158,618

TRICYCLE

Alfons Dobrowolski, Racine, Wis.

Application December 22, 1937, Serial No. 181,113

2 Claims. (Cl. 280—202)

My invention relates to improvement in tricycles, with particular reference to tricycles of that type disclosed in my former Patent No. 1,374,911, dated April 19, 1921, for an Auxiliary seat for tricycles.

In use it has been found that children often stand on the rear step, and this tends to tip the tricycle backwardly if the front seat is not occupied. Also, if both front and rear seats are occupied and one or more children attempt to stand on the rear step, the tricycle may be overloaded and accidents may be invited. For these and other reasons, it has long been recognized as desirable to provide a rear seat which faces forwardly, but inasmuch as this could not be done without reorganization, and as a demand exists for a rearwardly facing seat, a forwardly facing seat has not heretofore been regarded as practical.

The object of this invention is to provide means for overcoming the above stated objections by reorganizing the frame of a tricycle in such a manner that a rear seat of the general type shown in my former patent may be adjusted to face either forwardly or rearwardly.

Further objects are to provide improved structural features whereby the stability of such a tricycle may be improved to avoid or limit backwardly tilting movements, to provide improved means for connecting the rear portions of the frame and the seat with the axle, and to provide an improved frame structure.

In the drawing:

Figure 1 is a wide elevation of an improved tricycle embodying my invention.

Figure 2 is a plan view of the rear frame fork, wheels and seat, with the steering shaft and other parts illustrated in horizontal section.

Figure 3 is a view of the convergent end portions of the frame fork as they appear prior to assembly with the saddle post tube.

Figures 4, 5, and 6 are sections, drawn, respectively, to lines 4—4, 5—5 and 6—6 in Figure 2.

Figure 7 is a sectional view drawn to line 7—7 of Figure 1.

Like parts are identified by the same reference characters throughout the several views.

The seat supporting members mounted on the rear axle include apertured axle receiving portions 10 which are preferably flat in cross section, as best shown in Figure 2, and are provided with upwardly projecting post-like extensions 11 which enter tubular guides 12, welded or otherwise secured to the sides of the seat 13.

The posts 11 extend through apertures in a seat supporting bar 14, upon the upper side of which the seat 13 rests. Between the bar 14 and a shoulder 15 on the portion 10 a spring 17 is interposed. This spring is preferably coiled about the post 11, as shown.

The seat supporting members have their flat portions 10 extended downwardly from the axle and connected with channel bar seatings 20 for the flattened rear end portions 21 of horizontally extending arms 22 of the rear frame fork. The fork arms 22 may be removably secured in the channel members 20 by a tie rod 25 which may be riveted as at 26. Also, a latch 27 may be pivoted to the inner face of the channel bar 20, as indicated by dotted lines at 28, with one hook arm 29 adapted to drop over the tie rod, as shown in Figure 7, and another arm 30 extending over the channel bar 20 above the tie rod, as best shown in Figure 7. This latch provides added security for the connection between frame member 22 and the rear axle, and it is also used for purposes set forth in a companion application bearing even date herewith for improvements in convertible carriages for children.

The frame fork arms 20 are connected with the steering head 35 by obliquely pitched, upwardly convergent members 36, which are shaped and welded together to form the saddle supporting upper frame bar 37. The bar 37 has its forward extremity welded or otherwise secured to the steering head 35. To produce the bar 37, the upper ends of the frame members 36 may be bent and cut away to produce tapering extremities, concave in cross section, and fitted and welded together.

The members of the bar 37 are also fitted about and welded or otherwise secured to a saddle post receiving sleeve 38, and adjacent thereto the arms 36 extend downwardly and laterally at a widely divergent angle, to form a rear frame fork which includes the horizontal and substantially parallel arms 22. The arms 36 provide clearance for a forwardly projecting step or foot rest 40 depending from the rear seat 13. The sides of this seat or basket are provided with suitable arm rests 42 similar to those disclosed in said former patent.

As shown in Figure 1, the rear seat is reversible. It may occupy the position indicated by full lines in Figure 1, or it may be lifted from the posts 11 and reversed to occupy the position indicated by dotted lines in Figure 1. Owing to the elongated socket of the posts 11 in the tubes 12, the seat will be securely held in either position, although it can be freely withdrawn from the posts when lifted. Also, the entire assembly of the rear seat, axle and wheels may be detached from the frame members 22 by lifting the latch hooks 29 and withdrawing the tie rod 25. This makes it possible to convert the tricycle into a gocart or sled, as set forth in detail in my companion application.

The invention disclosed in this application provides a sturdy tricycle, in which the leverage exerted by the seat support will be insufficient to lift the front wheel from the ground when the rear seat is reversed and the step 40 occupied. Also, the downward extension of the member 10 makes it possible to mount the rear seat at a lower level than that which it occupies in the structure disclosed in my former patent, and the step 40 is therefore brought near the ground, particularly when loaded.

It will be observed that the housing guides 12 for the seat supporting posts 11 are located substantially along vertical lines at the middle of the sides of the basket. In either position of the basket, the center of gravity will be in close proximity to these posts. Ordinarily the rear portion of the basket or seat will be upholstered or provided with cushions, and the weight of the occupant will also be centered over the axle. The exterior wall of the basket or seat may be of sheet metal, and if the guides 12 are welded thereto, the occupant will be adequately supported.

I claim:

1. In a tricycle having a steering head and a rear axle provided near its respective ends with depending forwardly projecting channel-shaped coupling members having open-ended slots at the front ends of their vertical walls, the combination therewith of a connecting frame composed of a pair of tubular frame bars, welded together at their front ends, downwardly divergent in their middle portions and extended horizontally along parallel lines in their rear end portions, said rear end portions having flattened extremities adapted to fit the channels of the coupling members, a tie rod connecting said flattened extremities and engageable in the open ended slots of the coupling members, latches pivoted to the coupling members and adapted to engage the tie rod to secure the frame members in said channels and the tie rod in said slots, and a reversible seat mounted upon the rear axle and provided with a foot rest receivable between the horizontal frame bar members when the seat is in a forwardly facing position.

2. The combination set forth in claim 1, in which the welded portions of the frame bars are reenforced by a saddle supporting tube extending through and welded to the frame bars.

ALFONS DOBROWOLSKI.